United States Patent
Heyder

(10) Patent No.: US 7,592,726 B2
(45) Date of Patent: Sep. 22, 2009

(54) ELECTRIC MACHINE COMPRISING AN AXIAL SPRING-LOADED ELEMENT

(75) Inventor: Martin Heyder, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/587,531

(22) PCT Filed: Aug. 12, 2005

(86) PCT No.: PCT/EP2005/053978

§ 371 (c)(1), (2), (4) Date: Jul. 26, 2006

(87) PCT Pub. No.: WO2006/021523

PCT Pub. Date: Mar. 2, 2006

(65) Prior Publication Data

US 2007/0257569 A1    Nov. 8, 2007

(30) Foreign Application Priority Data

Aug. 25, 2004 (DE) .................. 10 2004 041 074

(51) Int. Cl.
H02K 5/173 (2006.01)
(52) U.S. Cl. .................. 310/90; 310/66; 384/517; 384/518
(58) Field of Classification Search .......... 384/517, 384/518; 310/247, 191, 209
See application file for complete search history.

(56) References Cited

U.S. PATENT DOCUMENTS

| | | | | |
|---|---|---|---|---|
| 362,572 A | * | 5/1887 | Clauss | 30/269 |
| 1,323,188 A | * | 11/1919 | Humphris | 411/164 |
| 3,002,794 A | * | 10/1961 | Bluemink | 384/204 |
| 5,237,228 A | * | 8/1993 | Fries | 310/87 |
| 5,811,902 A | * | 9/1998 | Sato | 310/90 |
| 5,811,903 A | * | 9/1998 | Ueno et al. | 310/90 |
| 5,907,199 A | * | 5/1999 | Miller | 310/12 |
| 5,959,381 A | * | 9/1999 | Fischer et al. | 310/90 |
| 6,024,177 A | * | 2/2000 | Winebrenner | 169/51 |
| 6,056,519 A | * | 5/2000 | Morita et al. | 417/415 |
| 6,368,039 B2 | * | 4/2002 | Wolfe et al. | 411/526 |
| 6,995,487 B2 | * | 2/2006 | Simpson et al. | 310/90 |
| 2005/0012417 A1 | * | 1/2005 | Fasterding et al. | 310/90 |
| 2005/0184601 A1 | * | 8/2005 | Kweon et al. | 310/36 |
| 2005/0285454 A1 | * | 12/2005 | Choi et al. | 310/14 |

FOREIGN PATENT DOCUMENTS

| | | |
|---|---|---|
| EP | 0 303 147 | 2/1989 |
| EP | 0 549 274 | 6/1993 |
| JP | 01268437 A * | 10/1989 |

(Continued)

*Primary Examiner*—Quyen Leung
*Assistant Examiner*—Naishadh N Desai
(74) *Attorney, Agent, or Firm*—Michael J. Striker

(57) ABSTRACT

The present invention relates to an axial spring element, and an electric machine (10), in particular for driving functional elements in a motor vehicle, with a rotor shaft (12), which is rotatably supported in a housing part (16) of a housing via a roller bearing (22, 20) An axial spring element (32) is located between the roller bearing (22, 20) and a rotor component (34) installed non-rotatably on the rotor shaft (12). The axial spring element (32) includes an inner ring (40) and an outer ring (42), which are interconnected in an axially resilient manner, and the outer ring (42) is axially connected to the rotor component (34).

14 Claims, 2 Drawing Sheets

FOREIGN PATENT DOCUMENTS

| | | | |
|---|---|---|---|
| JP | 05030701 A | * | 2/1993 |
| JP | 09093855 | | 4/1997 |
| JP | 2000308305 | | 11/2000 |
| JP | 2000308305 A | * | 11/2000 |
| JP | 2002336785 A | * | 11/2002 |
| RU | 2 140 700 | | 10/1999 |
| SU | 509949 | | 4/1976 |
| SU | 664262 | | 5/1979 |
| SU | 1451809 | | 1/1989 |

* cited by examiner

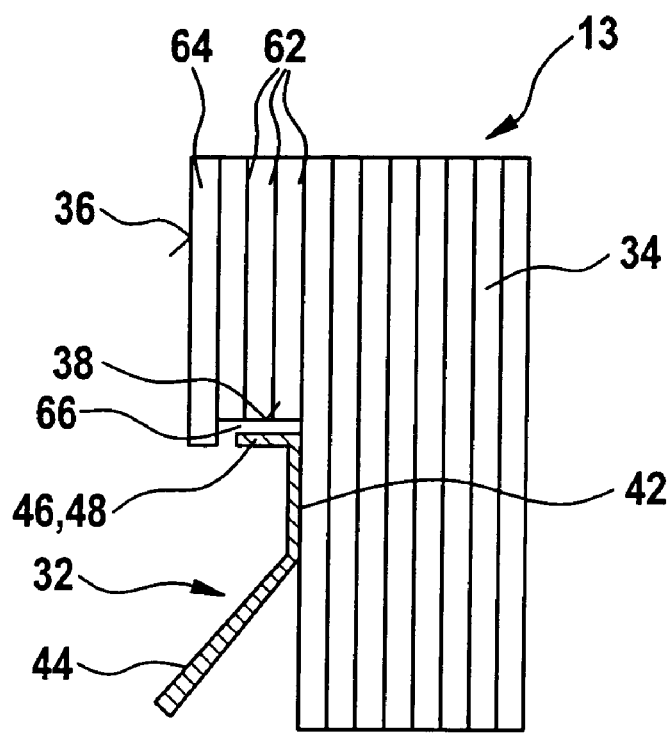
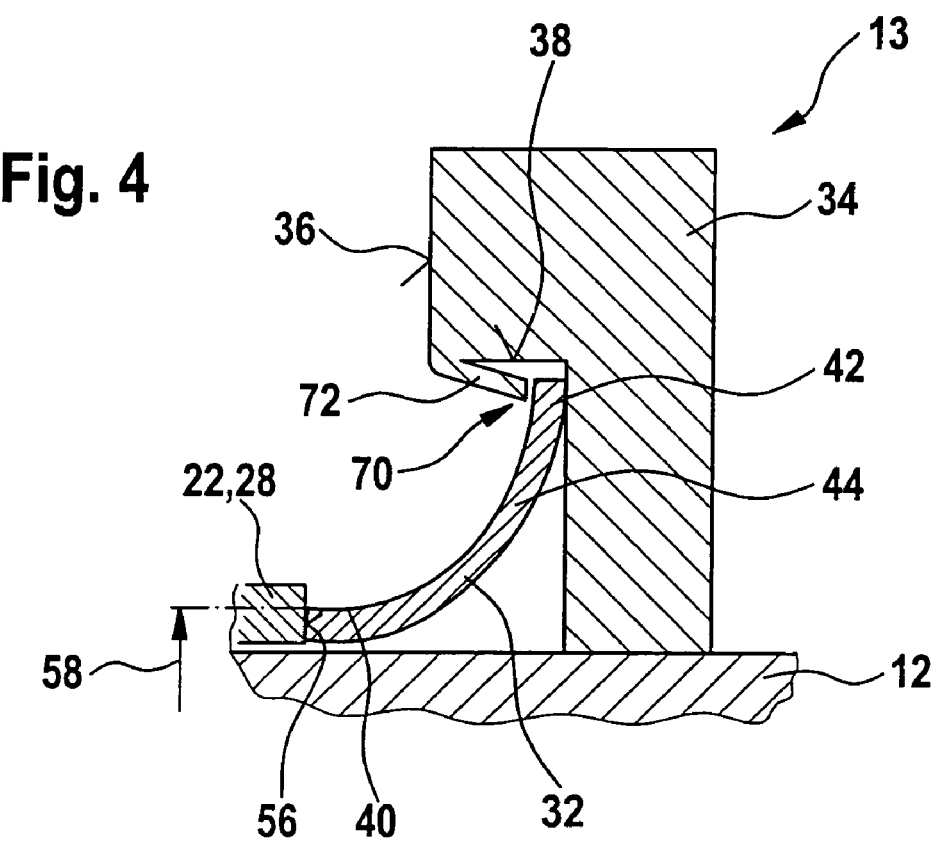

ic MACHINE COMPRISING AN
ELECTRIC MACHINE COMPRISING AN AXIAL SPRING-LOADED ELEMENT

CROSS-REFERENCE

The invention described and claimed hereinbelow is also described in PCT/EP 2005/053978, filed on Aug. 12, 2005 and DE 102004041074.7, filed Aug. 25, 2004. This German Patent Application, whose subject matter is incorporated here by reference, provides the basis for a claim of priority of invention under 35 U.S.C. 119 (a)-(d).

BACKGROUND OF THE INVENTION

The present invention relates to an electric machine with an axial spring element, and an axial spring element.

An electric motor was made known in JP 2000 30 8305 A, with which a rotor is supported in a housing a ball bearing. A plain washer is located on the rotor shaft between the ball bearing and the rotor that supports the rotor axially against the ball bearing. The plain washer includes an annular part, on which radially projecting, resilient parts are integrally moulded, the resilient parts bearing against the rotor core in a resilient manner. With a design of this type, the plain washer must be installed in a separate method step; this can result in problems caused by the plain washer tilting, due to the guidance of the plain washer on the rotor shaft.

SUMMARY OF THE INVENTION

The inventive electric machine and the inventive axial spring element having the characterizing features of the independent claims have the advantage that, due to the design of an outer ring that is connected with the inner ring of the spring element in a resilient manner, the spring element is capable of being securely fastened to a rotor component. As a result, the spring element can be installed together with the rotor component on the rotor shaft advantageously in one assembly step. Since the spring element is already fixedly connected to the rotor component when it is installed, the tolerance between the inner ring and the rotor shaft can be designed great enough to prevent the clamping ring from tilting when it is installed on the rotor shaft. In contrast to a spring element with radially projecting ends, the outer ring prevents the spring elements from catching on each other during shipment.

By way of the elastic connection of the inner ring with the outer ring, the spring element can be fixedly fastened via the outer ring to a rotor component on one side, and an axial, resilient, annular contact surface can be provided on the other side for the bearing.

Since the spring element is fastened to the rotor component, the inner ring can be designed radially very narrow, so that it bears, on the bearing side, only against the inner part of the bearing that is connected with the armature shaft. As a result, friction between the inner part and the outer part of the bearing is prevented via its sealing disk, thereby increasing the efficiency of the electric machine.

It is particularly favorable to design the resilient segments between the inner ring and the outer ring to be spiral-shaped, so that the outer diameter of the spring element does not increase when an axial load is placed on it. The axial range of spring, however, is attained by rotating the outer ring relative to the inner ring, which reduces the amount of radial installation space required.

If the diameter of the inner ring forms a clearance fit with the outer diameter of the rotor shaft, the axial installation and the axial backlash compensation of the spring element are simplified, since the spring element is thereby prevented from tilting on the rotor shaft. Radial play of this type between the armature shaft and inner ring is possible, since the radial guidance of the spring element is performed by the rotor component, not the rotor shaft.

If the outer ring of the spring element includes a circumferential outer wall that is preferably closed around the circumference, it can be pressed into a corresponding recess of the rotor component, to fix the spring element in position on this rotor component. A circumferential radial outer wall of this type prevents the spring elements from catching on each other during shipment.

The outer ring, in particular with the circumferential outer wall, also creates further possibilities for fastening the spring element to the rotor component that are favorable in terms of process engineering. For example, the outer ring can engage in a rear section or in a detent element of the rotor component. The outer ring can also be designed together with the rotor component as a bayonet connection, or it can be fastened thereto via plastic material deformation of the rotor component. A separate assembly step for fastening the spring element is eliminated as a result.

Particularly favorably, the outer ring can be fastened directly to the end face of the armature lamitation core, which is easily installable on the rotor shaft. The rotor shaft is then supported in the pole pot of an electric motor via the roller bearing.

To compensate for material expansions of the electric machine, the roller bearing against which the axial spring element bears is designed as a floating bearing. The inner part of the ball bearing, e.g., that is fixed in position on the rotor shaft, is axially movable within certain limits relative to the outer part. By locating a floating bearing of this type on one end of the rotor shaft, the rotor shaft can be supported at another point in the housing an easily-manufactured fixed bearing, without resulting in overrigid support of the armature shaft.

The axial spring element according to the present invention is suitable for use to provide any type of support of a shaft with a non-rotatable component in a corresponding bearing receptacle. Since the dimensionally stable outer ring can be fixed relatively easily to the shaft components at least axially, the inner ring connected elastically therewith provides a bearing surface for an annular bearing component. As a result, particularly with a ball bearing designed as a floating bearing with a sliding fit—with play—of the inner part on the rotor shaft, the inner part can be braced axially, to minimize noise and wear. Due to the spiral-shaped, elastic connecting segments, the outer diameter of the spring element remains advantageously constant.

BRIEF DESCRIPTION OF THE DRAWINGS

Various exemplary embodiments of an inventive device according to the present invention are presented in the drawing and are described in greater detail in the description below.

FIGS. 3 and 4 show further exemplary embodiments according to the depiction in FIG. 1.

DETAILED DESCRIPTION OF THE EXEMPLARY EMBODIMENTS

Figure 1:
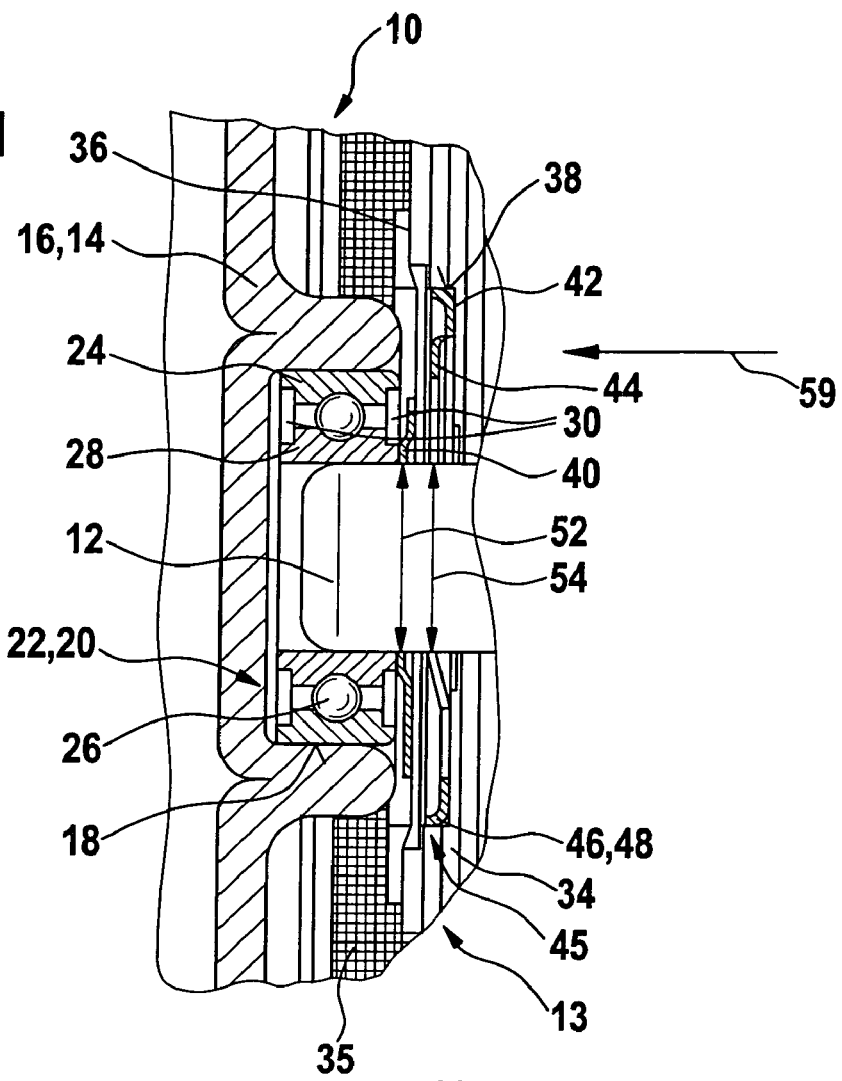
FIG. 1 shows a sectional view of portion of an electric machine.

FIG. 1 shows an electric machine 10, with which a rotor 13 that includes a rotor shaft 12 is supported in a housing part 16 designed as a pole pot 14. Housing part 16 includes a bearing receptacle 18 in which a roller bearing 22 designed as a ball bearing 20 is located. Roller bearing 22 includes an outer part 24 that bears radially against bearing receptacle 18. Inner part 28 is rotatable relative to outer part 24 via rolling elements 26, rolling elements 26 being covered with sealing disks 30. Inner part 28 accommodates rotor shaft 12, and roller bearing 22 is designed as a floating bearing, which allows rotor shaft 12 to be displaced easily in an axial direction relative to housing part 16. An axial spring element 32 is located on rotor 13 to axially brace rotor shaft 12 relative to roller bearing 22. Axial spring element 32 bears against inner part 28 of roller bearing 22 on one side and, on the other, it bears against a rotor component 34 located non-rotatably on rotor shaft 12. Rotor component 34 is designed, e.g., as an armature lamitation core 34 for accommodating electrical windings 35 and includes, on its end face 36, an annular recess 38 in which axial spring element 32 is fixed in position, at least axially. Spring element 32 includes an inner ring 40 and an outer ring 42 that are interconnected via spiral-shaped, axially resilient segments 44. In the exemplary embodiment, outer ring 42 includes a circumferential outer wall 46 that forms a radial press fit 45 with recess 38 of rotor component 34. In this case, spring element 32 is a stamped, bent part made of spring steel and includes crimping 50 or beading 50 in the region of circumferential wall 46 to serve as a reinforcement 48. Spring element 32 has an inner diameter 52 of inner ring 40 that is greater than diameter 54 of rotor shaft 12. An axial contact surface 56 against which roller bearing 22 rests is also formed on inner ring 40. Outer diameter 58 of axial contact surface 56 is dimensioned such that contact surface 56 bears only against inner part 40 of roller bearing 22. Axial contact surface 56 does not touch sealing disk 30 or outer part 24 of roller bearing 22, to prevent frictional losses between rotating rotor 13 and non-rotatable outer part 24.

To assemble electrical machine 10, axial spring element 32 is fixed in position at least axially on pre-installed rotor 13. For example, outer ring 42 is pressed into recess 38 of rotor component 34, which is non-rotatably connected with rotor shaft 12. As a result, spring element 32 is fixed securely in position on rotor 13, even when diameter 52 of inner ring 40 is greater than outer diameter 54 of rotor shaft 12; this allows rotor 13 to also be inserted overhead—via "blind assembly"—into roller bearing 22, which was previously installed in housing part 16. The axial preload of spring element can be adjusted via axial installation force 59. When thermal expansion occurs during operation, armature 13 is displaceable relative to housing part 16 while an axial clamping force is retained, without spring element 32 tilting on rotor shaft 13. This also prevents any loss of force due to friction when the axial preload force is applied.

Figure 2:
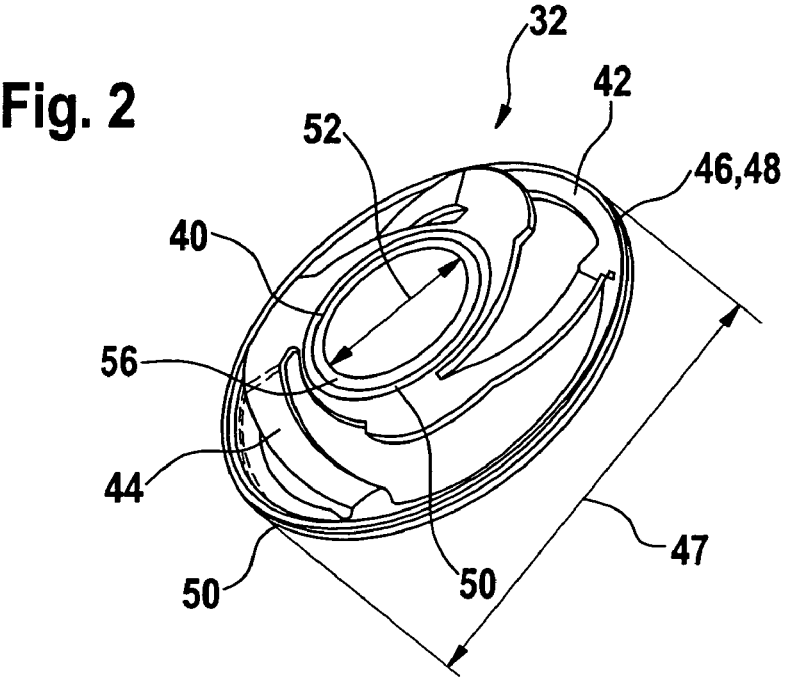
FIG. 2 shows an inventive, axial spring element according to FIG. 1.

FIG. 2 shows axial spring element 32 in FIG. 1 before it is installed in electric machine 10. Outer ring 42 and inner ring 40 are located concentrically with respect to each other, inner diameter 52 being greater than outer diameter 54 of rotor shaft 12. Spiral segments 44 are positioned such that, when an axial force 59 is applied, the change in the radial dimensions of spring element 32 (inner diameter 52, outer diameter 47 of circumferential wall 46) is negligible. The axial range of spring is provided via the rotation of inner ring 40 relative to outer ring 42, however. In the exemplary embodiment shown, three spiral-shaped braces 44 are stamped out, the number and shape of which can vary, depending on the application. Axial contact surface 56 on inner ring 40 is defined by a slight axial projection 50, which simultaneously serves as a reinforcement 48 for inner ring 40. Radial deformation of spring element 32 is prevented by reinforcement elements 48, which can be designed, e.g., as crimping 50, beading 50 or an axial projection 50.

FIG. 3 shows a further exemplary embodiment of an axial spring element 32, which is connected with rotor component 34 via a rear section 66. Rotor component 34 is designed as a laminated core. To form recess 38, a few lamina layers 62 have a larger annular recess 38 than uppermost lamina layer 64 on end face 36 of rotor component 34. Rear section 66, into which elastic spring element 32 can be inserted, is formed as a result. As a result, spring element 32 can be fixed in position axially and radially on rotor component 34, in an axially self-retaining manner. In this exemplary embodiment, spring element 32 has slight radial and axial play relative to rotor component 34, although this does not negatively affect the mode of operation of axial spring element 32.

In a further exemplary embodiment according to FIG. 4, detent elements 70, made of plastic, for example, are located on rotor component 34, into which outer ring 42 of axial spring element 32 is capable of being inserted in a lockable manner. A reliable axial fixation of spring element 32 on armature 13 is also created as a result, axial fixation enabling inner ring 40 to bear against inner part 28 of roller bearing 22 without rubbing on rotor shaft 12.

It should be noted that, with regard for the exemplary embodiments presented in the figures and the description, many different combinations of the individual features are possible. For example, the specific design of housing part 16, roller bearing 22 or rotor component 34 can be varied in any manner. Likewise, the design of axial spring element 32 can also be adapted to the required axial preload forces and the dimensions of rotor component 34 and roller bearing 22. Instead of using press fit 45, rear section 66 or detent connection 70 to axially secure spring element 32 on rotor component 34, it is also possible to use a bayonet connection, plastic material deformation or equally-acting connecting means. Spring element 32 and inventive electric machine 10 are particularly suited for driving functional elements in a motor vehicle, e.g., for adjusting motors of movable parts, or fan or pump motors of the type used, e.g., in an antilock braking system.

What is claimed is:

1. An electric machine (10) for driving functional elements in a motor vehicle, which includes a rotor shaft (12) that is rotatably supported in a housing part (16) of a housing via a roller bearing (22, 20), an axial spring element (32) being located between the roller bearing (22, 20) and a rotor component (34) on the rotor shaft (12), wherein the axial spring element (32) includes an inner ring (40) and an outer ring (42), which are interconnected in an axially resilient manner, and the outer ring (42) is connected with the rotor component (34) for a joint rotation relative to the housing part (16), wherein an inner diameter of the inner ring (40) forms a clearance fit with an outer diameter of the rotor shaft, thereby simplifying axial installation and axial backlash compensation of the spring element, wherein the rotor component (34) and not the rotor shaft (12) is configured to perform radial guidance of the spring element, and wherein for assembling the electrical machine (10), the axial spring element (32) is fixed in position at least axially on the pre-installed rotor (13), such that the rotor (13) is insertable overhead via a blind assembly into the roller bearing 22, which was previously installed in housing part 16.

2. The electric machine (10) as recited in claim 1, wherein the inner ring (40) and the outer ring (42) of the spring element (32) are interconnected via resilient segments (44).

3. The electric machine (10) as recited in claim 1, wherein the roller bearing (22, 20) includes an inner part (28), which accommodates the rotor shaft (12), and an outer part (24) supported in the housing part (16); the inner ring (40) of the spring element (32) bears axially against inner part (28)—and, in particular, not against the outer part (24)—of the roller bearing (22, 20).

4. The electric machine (10) as recited in claim 1, wherein the resilient segments (44) are located in a spiral formation around the rotor shaft (40), and the inner ring (40) is rotatable relative to outer ring (42), when an axial load is placed on the spring element (32).

5. The electric machine (10) as recited in claim 1, wherein the inner ring (40) has a larger inner diameter (52) than the outer diameter (54) of the rotor shaft (12), and the inner ring (40) does not bear against the rotor shaft (12).

6. The electric machine (10) as recited in claim 1, wherein the outer ring (42) includes a radial, circumferential outer wall (46) with a cylindrical outer surface that forms a press connection (45) with a cylindrical recess (38) in the rotor component (34).

7. The electric machine (10) as recited in claim 1, wherein the outer ring (42) is fixed in position axially on the rotor component (34) using a detent connection (70), a rear section (66), a bayonet connection, or a material deformation.

8. The electric machine (10) as recited in claim 1, wherein the rotor component (34) is designed as an armature lamination core, and the housing part (16) is designed as a pole pot (14).

9. The electric machine (10) as recited in claim 1, wherein the roller bearing (22, 20) is designed as a floating bearing (22, 20) located on the end of the rotor shaft (12), and the rotor shaft (12) is also supported in the housing via at least one fixed bearing.

10. An axial spring element (32), in particular as recited in claim 1, wherein the axial spring element (32) includes an inner ring (40) and a concentric outer ring (42) having a larger diameter (47), inner ring (40) and concentric outer ring (42) being interconnected in an axially resilient manner via elastic segments (44) located in a spiral formation, and the outer ring (42) includes a reinforcement (48, 50) for fixing the outer ring (42) in position axially on a rotor component (34).

11. The electric machine as defined in claim 8, wherein the outer ring is attached directly to an end face of the armature lamination core, wherein said armature lamination core has multiple lamella layers.

12. An electric machine (10) for driving functional elements in a motor vehicle, which includes a rotor shaft (12) that is rotatably supported in a housing part (16) of a housing via a roller bearing (22, 20), an axial spring element (32) being located between the roller bearing (22, 20) and a rotor component (34) on the rotor shaft (12), where in the axial spring element (32) includes an inner ring (40) and an outer ring (42), which are interconnected in an axially resilient manner, and the outer ring (42) is connected with the rotor component (34) for a joint rotation relative to the housing part (16), wherein the rotor component (34) is designed as an armature lamination core, and the housing part (16) is designed as a pole pot (14), and wherein the outer ring is attached directly to an end face of the armature lamination core, wherein said armature lamination core has multiple lamella layers, wherein the outer ring (42) includes a radial, circumferential outer wall (46) with a cylindrical outer surface that forms a press connection (45) with a cylindrical recess (38) in the rotor component (34).

13. An electric machine (10) for driving functional elements in a motor vehicle, which includes a rotor shaft (12) that is rotatably supported in a housing part (16) of a housing via a roller bearing (22, 20), an axial spring element (32) being located between the roller bearing (22, 20) and a rotor component (34) on the rotor shaft (12), where in the axial spring element (32) includes an inner ring (40) and an outer ring (42), which are interconnected in an axially resilient manner, and the outer ring (42) is connected with the rotor component (34) for a joint rotation relative to the housing part (16), wherein the rotor component (34) is designed as an armature lamination core, and the housing part (16) is designed as a pole pot (14), and wherein the outer ring is attached directly to an end face of the armature lamination core, wherein said armature lamination core has multiple lamella layers, wherein the outer ring (42) is fixed in position axially on the rotor component (34) using a detent connection (70), a rear section (66), a bayonet connection, or a material deformation.

14. An electric machine (10) for driving functional elements in a motor vehicle, which includes a rotor shaft (12) that is rotatably supported in a housing part (16) of a housing via a roller bearing (22, 20), an axial spring element (32) being located between the roller bearing (22, 20) and a rotor component (34) on the rotor shaft (12), where in the axial spring element (32) includes an inner ring (40) and an outer ring (42), which are interconnected in an axially resilient manner, and the outer ring (42) is connected with the rotor component (34) for a joint rotation relative to the housing part (16), wherein the rotor component (34) is designed as an armature lamination core, and the housing part (16) is designed as a pole pot (14), and wherein the outer ring is attached directly to an end face of the armature lamination core, wherein said armature lamination core has multiple lamella layers, wherein on the lamination core, a recess (38) is formed, wherein the outer ring engages in said recess (38), wherein to form the recess (38), some of said lamella layers have a larger annular recess (38) than an uppermost lamina layer on an end face (36) of the rotor component (34).

* * * * *